United States Patent Office.

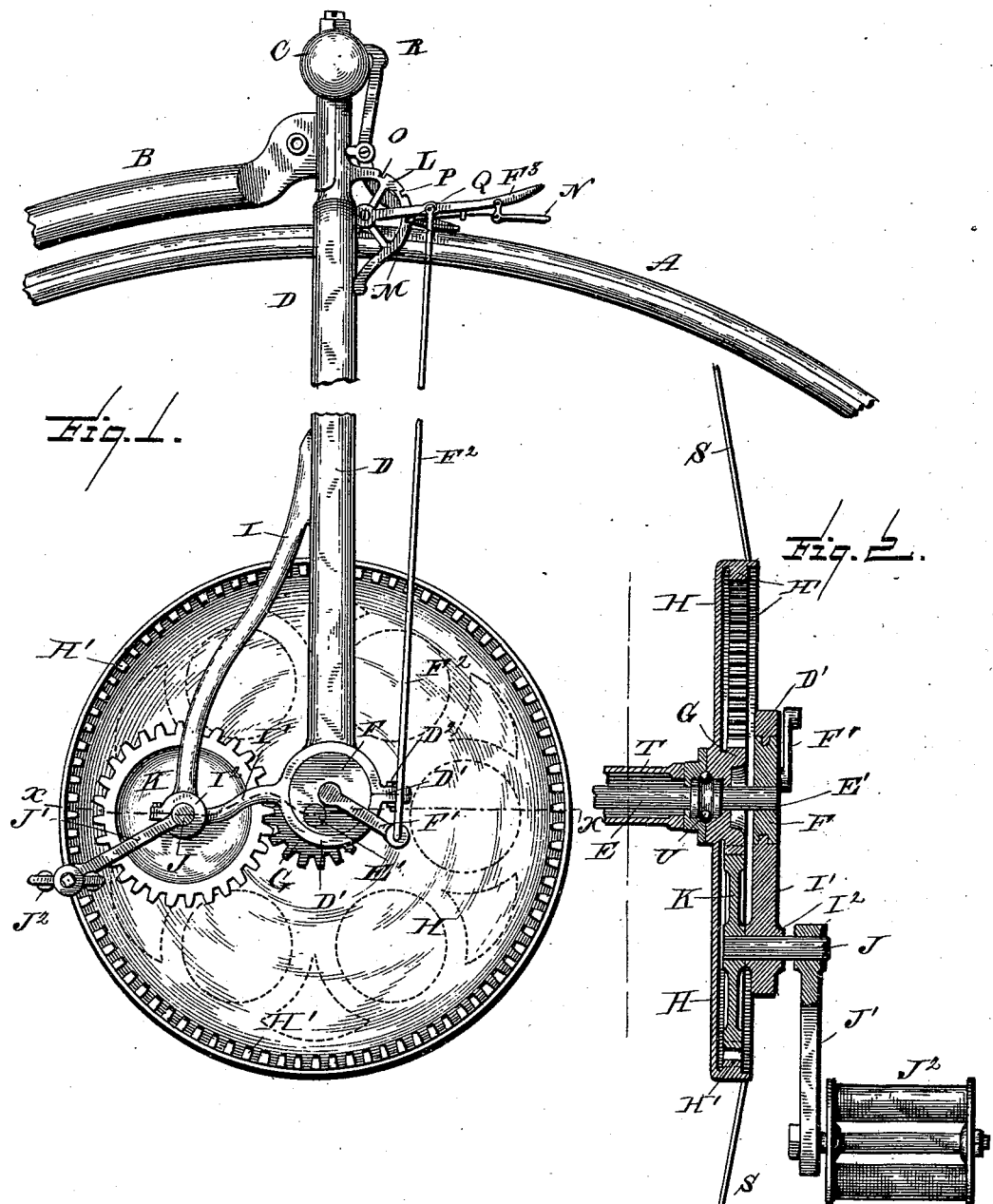

FREDERIC W. BROWN, OF ALBANY, NEW YORK.

BICYCLE.

SPECIFICATION forming part of Letters Patent No. 355,375, dated January 4, 1857.

Application filed October 9, 1886. Serial No. 215,794. (No model.)

*To all whom it may concern:*

Be it known that I, FREDERIC W. BROWN, a citizen of the United States, residing at Albany, in the county of Albany, State of New York, have invented certain new and useful Improvements in Bicycles, of which the following is a specification, reference being had therein to the accompanying drawings.

This invention has relation to bicycles, and more especially to the driving mechanism thereof, the object being, in the main, to provide means whereby the power exerted in driving the same may be conveniently directed to the production of speed, or of an increased leverage with a reduction of the speed.

Another object in view is to disconnect the driving mechanism for coasting purposes.

Other objects and advantages will appear in the following description, and the novel features of my invention will be particularly pointed out in the claims.

Referring to the drawings, Figure 1 is a side elevation of the principal elements of a bicycle provided with my improved driving mechanism. Fig. 2 is a transverse section on the line X of Fig. 1.

Like letters of reference indicate like parts in both the figures of the drawings.

A represents a portion of the tire, B a portion of the backbone, C the tiller-handle, and D the fork, of a bicycle.

E represents the axle, which is mounted for rotation in a bearing, E', formed in an eccentric, F, arranged in the lower end of the fork, the latter being split, as at D', so as to embrace the eccentric by a tongue-and-groove joint, a bolt, D², serving to secure the fork upon the eccentric.

Upon the axle there are two gears, G—one near each end of the axle—and these gears are either rigidly connected to or formed as a part of the hub H of the wheel, which is also provided with an internal gear or system of gear-teeth, H'. A branch fork, I, extends from the main fork to a point in rear of the latter and is connected by a branch or brace, I', with the lower end of the main fork. The branch fork is provided with a split bearing, I², for the treadle-shaft J, to which is rigidly secured the treadle-crank J', provided with the treadle J². The treadle-shaft J extends into the hub, and is provided with an intermediate gear, K, which is rigidly secured to the treadle-shaft.

A lever, F', extends from the eccentric F and is connected by a rod, F², with a shifting-lever, F³, pivoted on a sector, L, secured at the upper part of the main fork. A retaining-dog, M, is operated by a lever, N, pivoted to the shifting-lever F³, whereby said dog may be thrown into either of the notches O P Q, formed in the edge of the sector.

R is an ordinary brake.

This being the construction, the operation is as follows: It is of course understood that the mechanism above described is duplicated at the opposite side of the machine to that shown—that is to say, gears G and K are arranged in each hub of the wheel, from which the spokes S extend to the tire, the hubs being connected to each other in any suitable manner, as by a tube, T, and mounted upon the axle E by a ball-bearing, U, or otherwise, as desired. As shown in the drawings, the driving mechanism is in position to produce speed, in that power being applied at the treadle the gear K is revolved, and, being in mesh with the gear G, gives motion to the hub and wheel, and the proportion of the gears is such that a single revolution of the crank will produce two, or, if desired, more than two, revolutions of the hub and wheel. Now, by raising the lever F³ until the dog strikes in the upper notch, O, of the sector the eccentric is rotated upon the axle until its center is carried over and back of the center of the axle, which movement of the eccentric throws the fork backward, carrying with it the branch fork and the gear mounted therein, so that said gear is brought into mesh with the internal gear, H', of the hub, and out of mesh with the pinion G on the axle, in which position power is conveyed to the hub directly from the gear K, which is so proportioned with the internal gear that two, or, if desired, more than two, revolutions of the treadle-shaft are required to produce a revolution of the hub and wheel. In this manner the leverage upon the wheel is materially increased, while the speed is proportionately decreased. By stopping the shifting-lever at the central notch, P, of the sector the driving or intermediate gear, K, is held in a position where it will mesh with neither of the gears of the hub, so that the rider may "coast," the treadles being used as a foot-rest, or not, as desired.

Although I have herein shown and described my invention as applied to a bicycle, I do not limit the same to such use, but reserve my right to employ the same in tricycles, tandems, monocycles, and all machines adapted to be operated by the rider.

Having described my invention and its operation, what I claim is—

1. In a machine of the character described, driving mechanism comprising the following elements, to wit: an internally-geared hub provided with a pinion, an intermediate gear mounted on a crank-shaft, and means, substantially as specified, for throwing the intermediate into and out of mesh with the internal gear and the pinion, substantially as specified.

2. In a machine of the character described, a wheel provided with an internally-geared hub, a pinion secured to its axle, an eccentric mounted on the axle and in the fork, an intermediate gear mounted on a crank-shaft journaled in the fork, and means for throwing the eccentric, substantially as specified.

3. In a machine of the character described, a fork mounted on an eccentric, an axle having a bearing in the eccentric, and provided with a fixed internally-geared hub and a pinion, a crank-shaft carrying an intermediate gear, an eccentric-arm and connecting-rod, and a shifting-lever, together with devices for retaining the shifting-lever in desired positions, substantially as specified.

4. The combination, with the intermediate gear, K, shaft J, and crank J', of the forks D and I, the eccentric F, the hub H, the gear G, and the axle E, substantially as specified.

5. The combination of the fork D, the eccentric F, the gear K, the branch fork I, and the brace I' with the axle E, having the gear G, and the hub H, having the gear H', substantially as specified.

In testimony whereof I affix my signature in presence of two witnesses.

FREDERIC W. BROWN.

Witnesses:
W. H. HUDSON,
GEO. D. SMITH.